Patented July 12, 1949

2,476,261

UNITED STATES PATENT OFFICE 2,476,261

PROCESS FOR THE MANUFACTURE OF ASYMMETRICAL POLYAZO-DYESTUFFS

Hans Mayer, Basel, and Willy Widmer, Bottmingen, Switzerland, assignors to Ciba Limited, Basel, Switzerland, a Swiss firm No Drawing. Application March 19, 1947, Serial No. 735,790. In Switzerland April 11, 1946

6 Claims. (Cl. 260—173)

According to this invention valuable polyazo-dyestuffs are made by coupling a diazoazo-compound obtainable from 1 molecular proportion of tetrazotized 3:3'-dihydroxy-4:4'-diaminodiphenyl and 1 molecular proportion of a coupling component containing a sulfonic acid group with a coupling component free from sulfonic acid groups in the presence of a considerable quantity of pyridine.

Among the diazoazo-compounds obtainable from 1 molecular proportion of tetrazotized 3:3'-dihydroxy-4:4'-diaminodiphenyl and 1 molecular proportion of a coupling component containing a sulfonic acid group especially valuable are those for example, which are obtained from coupling components containing a sulfonic acid group and capable of coupling in a position vicinal to a hydroxyl group. Such coupling components are, for example, 1-(sulfoaryl)-3-methyl-5-pyrazolones, such as 1-(8'-sulfo-2'-naphthyl)-3-methyl-5-pyrazolone, 1-(3'-sulfophenyl)- or 1-(4'-sulfophenyl)-3-methyl-5-pyrazolone. In this connection there must be mentioned principally coupling components which contain a sulfonic acid group, and preferably only one such group, and which are capable of coupling in a position vicinal to a hydroxyl group in a naphthalene ring, for example, amino-hydroxynaphthalene sulfonic acids such as 2-amino-8-hydroxynaphthalene-6-sulfonic acid, 2-amino-5-hydroxynaphthalene-7-sulfonic acid or an N-substitution product thereof, and especially hydroxynaphthalene mono-sulfonic acids free from further substituents and capable of coupling in a position vicinal to the hydroxyl group, such as 1:3-, 1:4-, 1:5-, 2:4-, 2:5-, 2:6-, or 2:7-hydroxynaphthalene sulfonic acid. There may also be used with advantage as coupling components azo-dyestuffs which contain at least one sulfonic acid group and are capable of coupling in a position vicinal to a hydroxyl group in a naphthalene ring. Such azo-dyestuffs may be produced, for example, by coupling the diazo-compound of an amine, for example, an amine of the benzene series, such as 2-amino-1-benzoic acid, 5-amino-2-hydroxy-1-benzoic acid, 5-amino-2-chloro-1-benzoic acid, 4-chloro-1-aminobenzene-2-sulfonic acid, 4-nitro-1-aminobenzene-2-sulfonic acid or 4-amino-1:1'-azobenzene-4'-hydroxy-3'-carboxylic acid, in an acid medium with 2-amino-5-hydroxynaphthalene-7-sulfonic acid.

The diazoazo-compounds obtainable from 1 molecular proportion of tetrazotized 3:3'-dihydroxy-4:4'-diaminodiphenyl and 1 molecular proportion of a coupling component containing a sulfonic acid group are coupled in accordance with the invention in the presence of a considerable quantity of pyridine with coupling components free from sulfonic acid groups. As coupling components free from sulfonic acid groups there are especially valuable those which couple in a position vicinal to a hydroxyl group such, for example, as barbituric acid, 2:4-dihydroxyquinoline or 6:8-dihydroxyquinoline, and in the last mentioned group especially hydroxynaphthalenes, for example, 2:6- or 2:7-aminonaphthols and N-substitution products thereof, 2:4-, 2:5-, 2:6- or 2:7-dihydroxynaphthalene or mono-ethers thereof, 5:8-dichloro-1-naphthol, and especially 2-hydroxynaphthalene.

The diazoazo-compounds used as starting materials in the invention can be prepared, for example, by tetrazotizing 1 molecular proportion of 3:3'-dihydroxy-4:4'-diaminodiphenyl in the usual manner with the aid of hydrochloric acid and sodium nitrite, neutralizing the tetrazo-suspension, separating the tetrazo-compound by filtration, and coupling it, advantageously in an alkaline medium, for example, a medium rendered alkaline with an alkali carbonate, with 1 molecular proportion of a coupling component containing a sulfonic acid group. When the unilateral coupling is complete the resulting diazoazo-compound may be coupled, for example, with a solution which consists of the coupling component free from sulfonic acid groups and pyridine. The coupling takes place in the presence of a considerable quantity of pyridine, that is to say, the coupling mixture should contain more than 25 per cent. of pyridine. The alkali, which is generally required for coupling, may then be slowly run in advantageously in the form of a concentrated aqueous solution. As the alkali there may be used, for example, the carbonates or hydroxides of alkali metals which are customarily used, the solubility of the alkali being taken into account, if required. The temperature of coupling is advantageously kept low, especially at the outset of the reaction.

The coupling mass is worked up in a manner in itself known, for example, by removing the solvent by distillation and concentrating the mixture by evaporation, or by diluting the mixture and, if desired, after lowering the pH value by the addition of acid, salting out.

The polyazo-dyestuffs obtained by the process of the invention are especially suitable for dyeing cellulose fibers such as cotton, linen, and artificial silk and staple fibers of regenerated cellulose. When the dyestuff molecule contains metallizable groups, the dyestuffs may be converted in substance, in the dyebath or on the fiber into complex metal compounds, for example, copper, chromium, iron, nickel or cobalt compounds. The conversion into such complex metal compounds, which may contain a plurality of metals in the complex, is carried out by known methods in an acid, neutral or alkaline solution with or without suitable additions, such as salts of inorganic or organic acids, salts of acids forming complexes such as tartaric acid or aminoacetic acid, in the presence or absence of a diluent or suspending medium, such as pyridine or glycerine, and under atmospheric or superatmospheric pressure. The production of the complex metal, especially copper, compounds in substance is of special value in the case of those metal-free dyestuffs which have too weak an affinity and of which the metalliferous dyestuffs are of adequate solubility in the usual dyebaths.

In the case of those polyazo-dyestuffs of the invention which contain only few groups imparting solubility and have an adequate or good affinity for cellulose fibers in the metal-free condition, they may with advantage be treated on the fiber or in the dyebath or partly on the fiber and partly in the dyebath by known methods with agents yielding metal. It is of advantage, however, to use the process of Patent No. 2,148,659, in which the material is first dyed and then treated in the same bath with an agent yielding metal. As agents yielding metal there come into consideration in this connection advantageously those which are stable towards alkaline solutions, such as complex copper tartrates and the like.

There have already been described (see, for example, U. S. patent applications Ser. No. 498,884, Patent No. 2,426,977, filed August 16, 1943, and Ser. No. 498,885, Patent No. 2,439,153, filed August 16, 1943) processes for the manufacture of azo-dyestuffs from tetrazotized 3:3'-dihydroxy-4:4'-diaminodiphenyl. However, the coupling reactions are in all cases carried out in aqueous solution or suspension, and where an addition of pyridine is used the quantity thereof is very small so that it cannot be said to be a considerable quantity. On the other hand, by the process of the present invention in which pyridine is present in a relatively large quantity and in high concentration, that is to say, such that the solution has a content of more than 25 per cent. of pyridine and the greater part of the coupling component is dissolved in the pyridine, important advantages are obtained in that, for example, purer dyestuffs can be produced and/or better yields obtained.

The following examples illustrate the invention, the parts being by weight:

Example 1

21.6 parts of 3:3'-dihydroxy-4:4'-diaminodiphenyl are tetrazotized in the usual manner, and the tetrazo-compound is neutralized, separated by filtration, and introduced into a solution of 22.4 parts of 2-hydroxynaphthalene-6-sulfonic acid in 100 parts of water and 30 parts of potassium carbonate. The whole is stirred at 10–15° C. until the formation of the monoazo-dyestuff is complete and the tetrazo-compound can no longer be detected, and the reaction mixture is poured into a solution of 16 parts of 2-hydroxynaphthalene in 100 parts of pyridine. After the addition of a further 20 parts of potassium carbonate the whole is stirred at 10–20° C. until dyestuff formation is complete. The dyestuff is worked up in the usual manner while at the same time recovering the solvent, and is dried at a moderate temperature. The dyestuff dissolves with a violet coloration in water and with a blue coloration in caustic soda solution, and dyes cellulose fibers by the single bath or two-bath after-coppering process violet tints which are fast to washing and light.

By using 2-hydroxy-7-aminonaphthalene, instead of 2-hydroxynaphthalene, a similar dyestuff is obtained.

By using 2-hydroxynaphthalene-7-sulfonic acid, instead of 2-hydroxynaphthalene-6-sulfonic acid, a dyestuff yielding more bluish violet tints is obtained.

Example 2

The tetrazo-compound obtained in the usual manner from 21.6 parts of 3:3'-dihydroxy-4:4'-diaminodiphenyl is separated and introduced into a solution of 42 parts of the monoazo-dyestuff (obtained by coupling diazotized 4-amino-1-chloro-2-benzoic acid with 2-amino-5-hydroxynaphthalene-7-sulfonic acid in an acid medium) in 300 parts of water and 25 parts of potassium carbonate. The whole is stirred at 5–15° C. until the formation of the disazo-dyestuff ceases and the tetrazo-compound can no longer be detected. A solution of 16 parts of 2-hydroxy-naphthalene in 150 parts of pyridine is then added, 15 parts of a caustic soda solution of 30 per cent. strength are added dropwise in the course of one hour, and the whole is stirred while the temperature slowly rises until the coupling is finished. The dyestuff is worked up in the usual manner and dried under reduced pressure. A blue-black powder is obtained, which dissolves in water with a blue coloration and dyes cellulose fibers by the single bath or two-bath after-coppering process navy blue tints which are fast to washing and light.

Similar dyestuffs are obtained by using, instead of 4-amino-1-chloro-benzoic acid, anthranilic acid, 4-chloraniline-2-sulfonic acid, 4-nitraniline-2-sulfonic acid or para-amino-acetanilide. By using, on the one hand, the disazo-dyestuff obtained by coupling 4-amino-1:1'-azobenzene-4'-hydroxy-3'-carboxylic acid with 2-amino-5-hydroxynaphthalene-7-sulfonic acid in an acid medium, and, on the other, 2-hydroxynaphthalene, a tetrakisazo-dyestuff is obtained which dyes cellulose fibers by the single bath or two-bath after-coppering process intense violet-black tints which are fast to light and washing.

Example 3

The tetrazo-compound obtained in the usual manner from 21.6 parts of 3:3'-dihydroxy-4:4'-diaminodiphenyl is separated and introduced into a solution of 38.4 parts of 1-(2'-naphthyl)-3-methyl-5-pyrazolone-4':8'-disulfonic acid in 200 parts of water and 11 parts of calcined sodium carbonate. The whole is stirred at 10–15° C. until the formation of the monoazo-dyestuff is complete and the tetrazo-compound can no longer be detected, and the reaction mixture is poured into a solution of 16 parts of 2-hydroxynaphthalene in 200 parts of pyridine and 15 parts of caustic soda solution of 30 per cent. strength. The whole is stirred at 10–20° C. until the dyestuff formation is complete, and the dyestuff is worked up in the usual manner while at the same time recovering the solvent. After drying a dark brown powder is obtained, which dyes cellulose fibers by the single bath or two-bath after-coppering process violet tints which are fast to light.

*Example 4*

The tetrazo-compound obtained in the usual manner from 21.6 parts of 3:3'-dihydroxy-4:4'-diaminodiphenyl is separated and introduced at 10° C. into a solution of 22.4 parts of 2-hydroxynaphthalene-7-sulfonic acid in 100 parts of water and 30 parts of potassium carbonate. The whole is stirred at 10–15° C. until the tetrazo-compound can no longer be detected, and the reaction mixture is poured into a solution of 23 parts of 5:8-dichloro-1-hydroxynaphthalene in 200 parts of pyridine and 30 parts of a caustic potash solution of 30 per cent. strength. After the addition of a further 20 parts of potassium carbonate, the whole is stirred at 10–25° C. until dyestuff formation is complete, and the dyestuff is separated in the usual manner. A product is obtained which dyes cellulose fibers by the single bath or two-bath after-coppering process reddish blue tints which are fast to washing and light.

By using, for example, 2-hydroxynaphthalene, 2:3- or 2:6-dihydroxynaphthalene, 2:7-aminonaphthol or 2-hydroxy-6-methoxynaphthalene, instead of 5:8-dichloro-1-hydroxynaphthalene, similar products which yield blue-violet to navy blue dyeings are obtained.

*Example 5*

The tetrazo-compound obtained in the usual manner from 21.6 parts of 3:3'-dihydroxy-4:4'-diamino-diphenyl is separated and introduced at 0–5° C. into a solution of 23.9 parts of 2-amino-5-hydroxynaphthalene-7-sulfonic acid in 100 parts of water and 12 parts of calcined sodium carbonate. The whole is stirred at 5–10° C. until the tetrazo-compound can no longer be detected, the precipitated dyestuff is separated by filtration, and the moist paste is introduced into a solution of 16 parts of 2-hydroxynaphthalene in 100 parts of pyridine and 15 parts of caustic potash solution of 50 per cent. strength. The whole is stirred at 10–20° C. until dyestuff formation is complete, and the dyestuff is separated in the usual manner. By drying it a blue-black powder is obtained, which dissolves in water with a pure blue coloration and dyes cellulose fibers by the single bath or two-bath after-coppering process pure reddish blue shades which are fast to washing and light.

By using 2-amino-5-hydroxynaphthalene-1:7-disulfonic acid, instead of the 2:5:7-aminohydroxynaphthalene sulfonic acid, a somewhat purer product is obtained.

*Example 6*

100 parts of cotton are entered at 40° C. into a dyebath which contains 0.6 part of the dyestuff obtained as described in the first paragraph of Example 1 and 3 parts of sodium carbonate in 3000 parts of water, the temperature is raised to 90–95° C., 30 parts of Glauber salt are added, and dyeing is carried on at 90–95° C. for ¾ hour. The dyebath is then cooled to 80° C., the necessary quantity of a solution of complex copper tartrate rendered weakly alkaline with sodium carbonate is added, and the cotton is treated for about ½ hour at 80–90° C. The material is then thoroughly rinsed and, if desired, soaped for a short time. The cotton is dyed a fast violet tint.

What we claim is:

1. Process for the manufacture of an asymmetrical polyazodyestuff which comprises coupling a diazoazo-compound obtained from 1 molecular proportion of tetrazotized 3:3'-dihydroxy-4:4'-diaminodiphenyl and 1 molecular proportion of a coupling component containing a sulfonic acid group and capable of coupling in a position vicinal to a hydroxyl group in a naphthalene ring with a hydroxynaphthalene free from sulfonic acid groups and capable of coupling in a position vicinal to a hydroxyl group in the presence of more than 25 per cent. of pyridine in the coupling mixture.

2. Process for the manufacture of an asymmetrical polyazodyestuff which comprises coupling a diazoazo-compound obtained from 1 molecular proportion of tetrazotized 3:3'-dihydroxy-4:4'-diaminodiphenyl and 1 molecular proportion of a coupling component containing a sulfonic acid group and capable of coupling in a position vicinal to a hydroxyl group in a naphthalene ring with 2-hydroxynaphthalene in the presence of more than 25 per cent. of pyridine in the coupling mixture.

3. Process for the manufacture of an asymmetrical polyazodyestuff which comprises coupling a diazoazo-compound obtained from 1 molecular proportion of tetrazotized 3:3'-dihydroxy-4:4'-diaminodiphenyl and 1 molecular proportion of a hydroxynaphthalene monosulfonic acid free from further substituents and capable of coupling in a position vicinal to the hydroxyl group with 2-hydroxynaphthalene in the presence of more than 25 per cent. of pyridine in the coupling mixture.

4. Process for the manufacture of an asymmetrical disazodyestuff which comprises coupling the diazoazo-compound obtained from 1 molecular proportion of tetrazotized 3:3'-dihydroxy-4:4'-diaminodiphenyl and 1 molecular proportion of 2-hydroxynaphthalene-6-sulfonic acid with 2-hydroxynaphthalene in the presence of more than 25 per cent. of pyridine in the coupling mixture.

5. Process for the manufacture of an asymmetrical trisazodyestuff which comprises coupling the diazoazo-compound obtained from 1 molecular proportion of tetrazotized 3:3'-dihydroxy-4:4'-diaminodiphenyl and 1 molecular proportion of the monoazo-dyestuff obtained by coupling in an acid medium diazotized 4-amino-1-chloro-2-benzoic acid with 2-amino-5-hydroxynaphthalene-7-sulfonic acid, with 2-hydroxynaphthalene in the presence of more than 25 per cent. of pyridine in the coupling mixture.

6. Process for the manufacture of an asymmetrical disazodyestuff which comprises coupling the diazoazo-compound obtained from 1 molecular proportion of tetrazotized 3:3'-dihydroxy-4:4'-diaminodiphenyl and 1 molecular proportion of 2-hydroxynaphthalene-7-sulfonic acid with 5:8-dichloro-1-hydroxynaphthalene in the presence of more than 25 per cent. of pyridine in the coupling mixture.

HANS MAYER.
WILLY WIDMER.

(References on following page)

REFERENCES CITED

The following references are of record in the file of this patent:

UNITED STATES PATENTS

| Number | Name | Date |
|---|---|---|
| 1,210,751 | Anderwert | Jan. 2, 1917 |
| 1,292,385 | Anderwert et al. | Jan. 21, 1919 |
| 2,424,006 | Straub et al. | July 15, 1947 |
| 2,426,977 | Straub et al. | Sept. 9, 1947 |
| 2,427,537 | Straub et al. | Sept. 16, 1947 |

FOREIGN PATENTS

| Number | Country | Date |
|---|---|---|
| 102,881 | Great Britain | Jan. 4, 1917 |
| 248,230 | Great Britain | Mar. 4, 1926 |
| 287,232 | Great Britain | Mar. 16, 1928 |
| 298,518 | Great Britain | Oct. 8, 1928 |
| 347,742 | Great Britain | Apr. 30, 1931 |
| 410,192 | Great Britain | May 14, 1934 |
| 229,184 | Switzerland | Jan. 3, 1944 |
| 231,843 | Switzerland | July 17, 1944 |
| 232,503 | Switzerland | Aug. 16, 1944 |
| 232,504 | Switzerland | Aug. 16, 1944 |
| 232,505 | Switzerland | Aug. 16, 1944 |
| 232,506 | Switzerland | Aug. 16, 1944 |
| 232,507 | Switzerland | Aug. 16, 1944 |
| 232,508 | Switzerland | Aug. 16, 1944 |
| 232,509 | Switzerland | Aug. 16, 1944 |
| 232,510 | Switzerland | Aug. 16, 1944 |
| 233,083 | Switzerland | Sept. 16, 1944 |
| 233,084 | Switzerland | Sept. 16, 1944 |
| 650,688 | France | Sept. 25, 1928 |

OTHER REFERENCES

K. H. Saunders: The Aromatic Diazo Compounds (1936), pages 115, 116.